(12) United States Patent
Sepahvand

(10) Patent No.: US 11,146,109 B2
(45) Date of Patent: Oct. 12, 2021

(54) WIRELESS POWER SYSTEMS WITH CHARGING STATUS INFORMATION

(71) Applicant: Apple Inc., Cupertino, CA (US)

(72) Inventor: Hossein Sepahvand, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 16/675,082

(22) Filed: Nov. 5, 2019

(65) Prior Publication Data

US 2021/0044149 A1 Feb. 11, 2021

Related U.S. Application Data

(63) Continuation-in-part of application No. 16/562,278, filed on Sep. 5, 2019, now abandoned.

(60) Provisional application No. 62/884,391, filed on Aug. 8, 2019.

(51) Int. Cl.
| | | |
|---|---|---|
| *H01M 10/46* | (2006.01) | |
| *H02J 50/12* | (2016.01) | |
| *H02J 50/80* | (2016.01) | |
| *H02J 7/02* | (2016.01) | |
| *H02J 7/00* | (2006.01) | |
| *H02J 7/34* | (2006.01) | |

(52) U.S. Cl.
CPC ............ *H02J 50/12* (2016.02); *H02J 7/0047* (2013.01); *H02J 7/025* (2013.01); *H02J 7/342* (2020.01); *H02J 50/80* (2016.02); *H02J 7/0048* (2020.01)

(58) Field of Classification Search
CPC .. H02J 50/12; H02J 50/80; H02J 50/10; H02J 50/402; H02J 7/342; H02J 7/0047; H02J 7/0048; H02J 7/0034; H02J 7/0044; H02J 7/0045

USPC ................. 320/107, 108, 114, 115, 132, 149
See application file for complete search history.

(56) References Cited

U.S. PATENT DOCUMENTS

| | | | |
|---|---|---|---|
| 8,260,998 | B2 | 9/2012 | Ganesh et al. |
| 8,723,642 | B2 | 5/2014 | Park et al. |
| 9,496,732 | B2 | 11/2016 | Partovi |
| 10,110,030 | B1 | 10/2018 | Colosimo et al. |
| 2012/0268238 | A1 | 10/2012 | Park et al. |

(Continued)

FOREIGN PATENT DOCUMENTS

| | | |
|---|---|---|
| JP | 2012100491 A | 5/2012 |
| JP | 2015050719 A | 3/2015 |
| JP | 2017143639 A | 8/2017 |

*Primary Examiner* — Edward Tso
(74) *Attorney, Agent, or Firm* — Treyz Law Group, P.C.; G. Victor Treyz; Joseph F. Guihan

(57) ABSTRACT

A wireless power system has a wireless power transmitting device and a wireless power receiving device. The wireless power transmitting device may be a wireless charging mat or other device with a charging surface. The wireless power receiving device may be a portable electronic device receiving transmitted wireless power signals from the wireless power transmitting device while resting on the charging surface. A sensor in the wireless power transmitting device or elsewhere in the system may detect user input. In response to the user input, the wireless power receiving device may display information on the state of charge of a battery in the wireless power receiving device and other charging status information on a display of the wireless power receiving device. The user input may be a finger tap on the charging surface or other user input.

14 Claims, 4 Drawing Sheets

(56) References Cited

U.S. PATENT DOCUMENTS

| | | |
|---|---|---|
| 2015/0054458 A1 | 2/2015 | Yoon et al. |
| 2016/0046199 A1 | 2/2016 | Butler et al. |
| 2016/0336804 A1 | 11/2016 | Son et al. |
| 2017/0066342 A1 | 3/2017 | Butler et al. |
| 2017/0133881 A1 | 5/2017 | Cho et al. |
| 2018/0034307 A1 | 2/2018 | Ha et al. |
| 2018/0039368 A1 | 2/2018 | Choi et al. |
| 2018/0351373 A1* | 12/2018 | Behzadi .................... G06F 1/26 |
| 2019/0081499 A1 | 3/2019 | Sun et al. |
| 2019/0097448 A1 | 3/2019 | Partovi |

* cited by examiner

WIRELESS POWER SYSTEMS WITH CHARGING STATUS INFORMATION

This application is a continuation-in-part of patent application Ser. No. 16/562,278, filed Sep. 5, 2019, which claims the benefit of provisional patent application No. 62/884,391, filed Aug. 8, 2019, which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The portable electronic device has a coil and rectifier circuitry. The coil of the portable electronic device receives alternating-current wireless power signals from the wireless charging mat. The rectifier circuitry converts the received signals into direct-current power. A wireless charging mat may have the ability to simultaneously charge multiple wireless power receiving devices at the same time.

SUMMARY

A wireless power system has a wireless power transmitting device and a wireless power receiving device. The wireless power transmitting device may be a wireless charging mat or other device with a charging surface. The wireless power receiving device may be a portable electronic device receiving transmitted wireless power signals from the wireless power transmitting device while resting on the charging surface.

The wireless power receiving device may have a display. A sensor in the wireless power transmitting device or elsewhere in the system (including wireless power receiving devices) may detect user input. In response to the user input, the wireless power receiving device may display information on the state of charge of a battery in the wireless power receiving device and other charging status information on the display of the wireless power receiving device.

The user input may be a finger tap on the charging surface that is gathered using a sensor such as an accelerometer in the wireless power transmitting device or any wireless power receiving device that is charging on the wireless power transmitting device. User input gathered using other sensors or other actions such as removal of the wireless power receiving device from the charging surface may also serve as triggering events for causing the display of the charging status information.

DETAILED DESCRIPTION

A wireless power system includes a wireless power transmitting device such as a wireless charging mat. The wireless power transmitting device wirelessly transmits power to one or more wireless power receiving devices. The wireless power receiving devices may include devices such as a wrist watches, cellular telephones, tablet computers, laptop computers, or other electronic equipment. Each wireless power receiving device uses power from the wireless power transmitting device for powering the device and for charging an internal battery.

Wireless power is transmitted from the wireless power transmitting device to a wireless power receiving device using one or more wireless power transmitting coils. The wireless power receiving device has one or more wireless power receiving coils coupled to rectifier circuitry that converts received wireless power signals into direct-current power.

Figure 1:
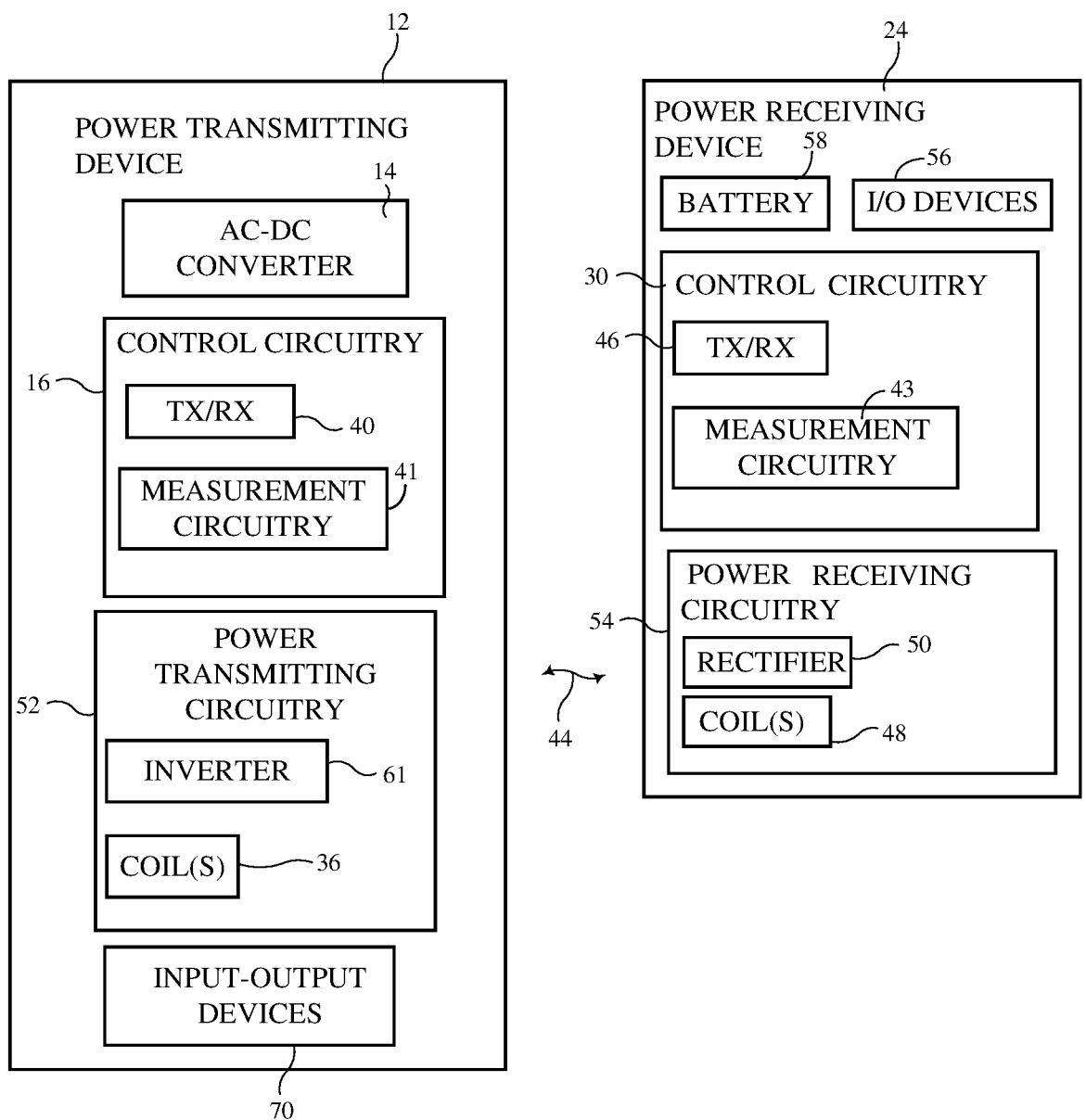
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data to detect foreign objects and perform other tasks, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat are sometimes described herein as an example.

Power receiving device 24 may be a portable electronic device such as a wrist watch, a cellular telephone, a laptop computer, a tablet computer, an accessory such as an earbud, a removable battery case for a cellular telephone, a removable battery case for a pair of earbuds, or other external battery pack, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coils 36. These coil drive signals cause coil(s) 36 to transmit wireless power. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information (e.g., one or more charging status indicator light-emitting diodes for indicating charging status), haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may have one or more input-output devices 70 (e.g., input devices and/or output devices of the type described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. The out-of-band wireless signals that are conveyed between devices 12 and 24 (and, if desired, the wireless signals conveyed between device 12 and/or device 24 and/or other equipment) may be personal area network communications (e.g., Bluetooth® communications), wireless local area network communications (e.g., IEEE 802.11 WiFi® communications), near-field communications (NFC) signals at 13.56 MHz or other suitable near-field communications frequency, other short-range wireless communications, and/or wireless signals associated with other types of wireless communications. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. In-band and out-of-band wireless communications may be used to convey power transmission control commands, status information, information indicating to device 12 that device 24 is present on the charging surface of device 12, information indicating to device 24 that device 24 is present on the charging surface of device 10, information indicating to device 12 and/or device 24 that device 12 is transmitting power to device 24 that is being received by device 24, and other information.

It is desirable for power transmitting device 12 and power receiving device 24 to be able to communicate information such as received power, battery states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The housing of device 12 may have polymer walls, walls of other dielectric, metal structures, fabric, and/or other housing wall structures that enclose coils 36 and other circuitry of device 12. The charging surface may be a planer outer surface of the upper housing wall of device 12. Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 and/or on optional foreign object detection coils in device 12 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information, Q-factor information, etc.) and signal detection circuitry (e.g., filters, analog-to-digital converters, impulse response measurement circuits, etc.). In some configurations, Q-factor measurements and other measurements may be made during wireless power transfer operations. Switching circuitry in device 12 may be used to switch desired coils into use during wireless power transmission and/or foreign object detection operations.

Measurement circuitry 43 in control circuitry 30 and/or measurement circuitry 41 in control circuitry 16 may be used in making current and voltage measurements. Based on this information or other information, control circuitry 30 can configure rectifier circuitry 50 to help enhance wireless power reception by coils 48.

Figure 2:
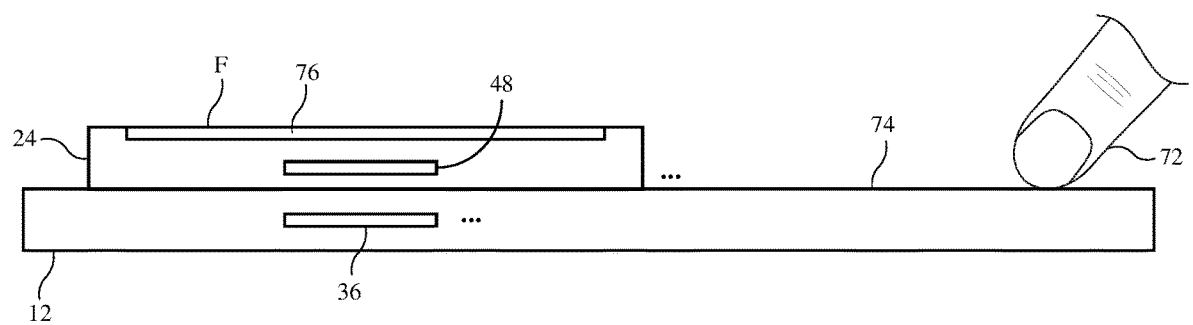
FIG. 2 is a cross-sectional side view of an illustrative wireless power system in accordance with an embodiment.

FIG. 2 is a cross-sectional side view of system 8. In the illustrative configuration of FIG. 2, device 12 has one or more wireless power transmitting coils 36 that are used in transmitting wireless power. As shown in FIG. 2, device 12 and device 24 each have a respective housing formed from polymer walls, walls of other dielectric, metal structures, fabric, and/or other housing wall structures that enclose internal circuitry. The upper surface of device 24 forms wireless charging surface 74. During operation, one or more wireless power receiving devices such as device 24 may be placed on wireless charging surface 74 (e.g., the uppermost surface of the housing of device 12) to receive wireless power. Each device 24 may have one or more wireless power receiving coils 48. Front face F of device 24 or other portions of device 24 may have a display such as display 76. Display 76 and/or other input-output devices 56 may be used in providing information on charging status (e.g., battery level information, information on whether charging is active or inactive, rate of charging, time left to full charge, etc.) and other information to a user.

During long periods of user inactivity (e.g., when devices 24 are resting on charging surface 74 in the absence of active user interactions), the display(s) in system 8 may be turned off (e.g., a black screen may be displayed). This may help reduce visual clutter, may enhance display lifetime, and may help conserve power.

After charging is underway and display 76 is blank, a user may desire to monitor the status of system 8. For example, a user may want to know whether the batteries in one or more devices 24 are fully charged, whether wireless power is being transferred (e.g., whether charging operations are currently taking place), and/or other information on the operation of system 8. To awaken the display(s) of system 8 and direct system 8 to display charging status information, triggering input may be provided to system 8.

As an example, a user may tap on surface 74 or any power receiving device (e.g., device 24) with the user's finger 72 or other external object. In response to detecting touch (tap) input, system 8 may display charging status information and other information on one or more displays such as display 94. For example, each device 24 in system 8 may be directed to determine the state of its battery 58 and to display information on that battery's state of charge and to display information on whether charging operations are active. If desired, charging status information for multiple devices 24 may be displayed on a single display. For example, charging status information for a wrist watch and a pair of earbuds may be displayed along with cellular telephone charging status information on the display of the cellular telephone. In some configurations, device 12 may include a display for displaying charging status information.

In addition to or instead of tapping on surface 74 to direct system 8 to display charging status information on one or more displays, sensors in system 8 (e.g., one or more sensors in device 12 and/or in one or more of devices 24) may be used to detect other input. Examples of input that may be sensed include double taps, force input (e.g., light and/or heavy taps, light and/or heavy sustained finger press events, etc.), touch gestures (e.g., swipes, multitouch gestures, etc.), air gesture input (e.g., three-dimensional hand motions within range of a three-dimensional gesture detection sensor, camera, or other sensor for detecting hand motions), eye (gaze) input, voice commands, detection of removal of device 24 from charging surface 74 (e.g., by detecting the interruption of wireless power transmission that is indicative of removal of device 24 from surface 74, by detecting lifting motion with a motion sensor in device 24, by detecting lifting motion with a camera or other sensor, etc.), and input associated with detection of removal of a charging cable and/or other cable from a connector port in device 24 (e.g., using a connector sensor that detects presence or absence of the cable connector, by detecting removal of wired power delivery to device 24, etc.).

In some scenarios, triggering input is received by a sensor in device 12. For example, if a user taps on surface 74, an accelerometer or other motion sensor in device 12 can detect vibrations or other motion in surface 74. In response, control circuitry 16 may communicate with control circuitry 30 to direct control circuitry 30 to gather and display charging status information on display 76. In other scenarios, triggering input is received by a sensor in device 24. For example, if a user taps on surface 74, this will jiggle surface 74 and result in detectable movement of device 24. An accelerometer or other motion sensor in device 24 can then detect the user input and take suitable action. In taking action (e.g., directing charging status information be displayed on one or more devices 24 or other action), device 24 can communicate with other devices 24 directly (e.g., using Bluetooth®, etc.) or via device 12. In some embodiments, input from multiple sensors and/or sensors in one or more devices 12 and/or 24 can be combined using a sensor fusion arrangement. For example, system 8 may display charging status information in response to detection of motion of device 12 with a motion sensor in device 12 and detection of associated motion of device(s) 24 with a motion sensor in device(s) 24.

In some embodiments, device 24 is a removable battery case that is configured to receive a pair of ear buds. A user may remove the earbuds from device 24 for use. When the user has finished using the earbuds, the user may store the earbuds within interior compartments in device 24. In this type of embodiment, device 24 has a battery that recharges batteries in the earbuds. The battery of device 24 is charged wirelessly by placing device 24 on device 12 as shown in FIG. 2.

To indicate the status of device 24 in this type of arrangement, device 24 has a visual output device such as a display or a status indicator light (e.g., a light-emitting device in input-output devices 56, which is sometimes referred to as a charging status indicator, light-emitting diode status indicator, status indicator, charging status indicator light, etc.). A status indicator light is formed from one or more light-emitting diodes (or, if desired, lasers or other light-emitting components). The color, intensity, blink pattern, number of illuminated light-emitting diodes, and/or other characteristics of the light-emitting diodes in a charging status indicator light can be adjusted by the control circuitry of device 24 to supply a user with visual battery charging status information.

The charging status indicator light can be activated whenever wireless charging is performed (e.g., whenever wireless power is being received by device 24), whenever device 24 is present on device 12, and/or at any other suitable time. If desired, the charging status indicator light can be turned off (e.g., temporarily deactivated) whenever device 24 is off of device 12 and/or is not receiving power.

The charging status indicator light can also be turned off after a predetermined amount of output time. If, for example, the charging status indicator light has been illuminated for 20 seconds, the charging status indicator light may automatically turn off. At a later time, the charging status indicator light may be reawakened and used to visually display charging status information. For example, the charging status indicator light can be turned on and used to visually present charging status information to the user in response to determining that device 24 has been placed on the charging surface of device 12 and/or in response to a tap on device 24 and/or 12 that is detected by an accelerometer in device 24 and/or that is detected by an accelerometer in device 12.

Consider, as an example, a scenario in which the earbuds battery case (e.g., the housing of the case) is not located on device 12 and is not being charged. In this scenario, the charging status indicator light may be turned off after a predetermined period of time (e.g., 20s). When a user desires to view the charging status information for the earbuds battery case, the user may tap on the earbuds battery case. An accelerometer in the case detects the tap and activates the charging status indicator.

If desired, the earbuds battery case (e.g., the housing of the case) may be located on the charging surface of device 12. After displaying the charging status information for a predetermined amount of time (e.g., 20s), the charging status indicator may be turned off. To view the charging status information, the user may tap on the battery case (device 24) and/or device 12.

In some embodiments, the charging status indicator light is only turned on when device 24 (e.g., the housing of device 24) is on the charging surface of device 12 and/or is receiving power from device 12. With this arrangement, motion of device 24 (e.g., a tap on device 24) while device 24 is on device 12 causes device 24 to activate the charging status indicator light and visually display charging status information for the user, whereas motion of device 24 (e.g., taps or other motion of device 24) while device 24 is being carried in a user's pocket or is otherwise not on device 12 will not activate the charging status indicator light so that the charging status information will not be displayed.

In some examples, device 24 determines that it is on device 12 when device 24 is receiving power wirelessly. In some examples, device 24 determines that device 24 is on device 12 when device 24 is receiving a wireless signal from device 12. The wireless signal may be a Bluetooth® signal, a near-field communications signal, or other out-of-band signal and/or may be a wireless signal transmitted by coil(s) 36 and received by coil(s) 48. The wireless signal may, if desired, be associated with a predetermined digital ping (e.g., a wireless signal impulse or other wireless signal created by driving signals onto one or more of coils 36 to measure the impedance of coil(s) 36 or to otherwise make wireless measurements on device 24, etc.). The wireless signal may be received using coil(s) 48 or a separate antenna in device 24 (e.g., an antenna in transceiver circuitry 46).

Any suitable control architecture may be used in system 8. For example, device 12 may serve as a master device and devices 24 may serve as slaves that respond to commands from the master device, a given one of devices 24 may serve as a master device and device 12 and non-master devices 24 may serve as slave devices, devices 12 and 24 may serve as peer devices operating in a peer-to-peer network, etc.

Figure 3:
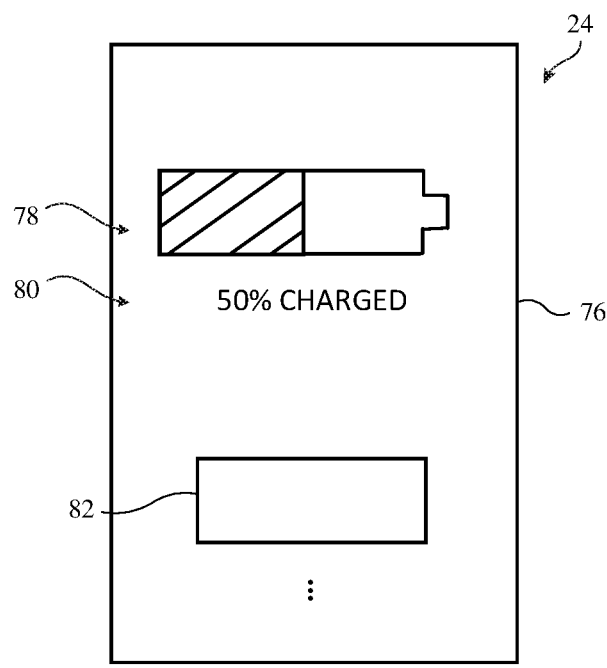
FIG. 3 is a diagram of an illustrative display for an electronic device in a wireless power system in accordance with an embodiment.

FIG. 3 shows illustrative information such as charging status information that can be displayed on display 76 of device 24 in response to a triggering event such as detected tap input on surface 74. The illustrative information that is displayed on display 76 of device 24 of FIG. 3 includes battery state-of-charge indicator icon 78. Icon 78 can use a bar-type indicator (or other suitable indicator such as a circular indicator, triangular indicator, etc.) to indicate visually to the user the amount of charge on battery 58. For example, if battery 58 is half charged, a colored bar may be presented that fills half of the graphical battery of icon 78. Battery state-of-charge may also be displayed using alphanumeric characters 80. Optional additional information (e.g., an icon, text, etc.) may also be presented, as illustrated by optional additional information 82 of FIG. 3. Information 82 may indicate whether device 24 is currently receiving wireless power or not and may include other status information related to wireless power transfer operations, battery state-of-charge, and/or other system parameters (e.g., rate of charge, approximate time left to reach full charge, etc.). The amount of area consumed by icon 78, characters 80, and/or information 82 may be sufficient to allow a user to view this information from a distance (e.g., this amount of area may be at least 10%, at least 20%, or less than 99% of the total area of display 76).

Figure 4:
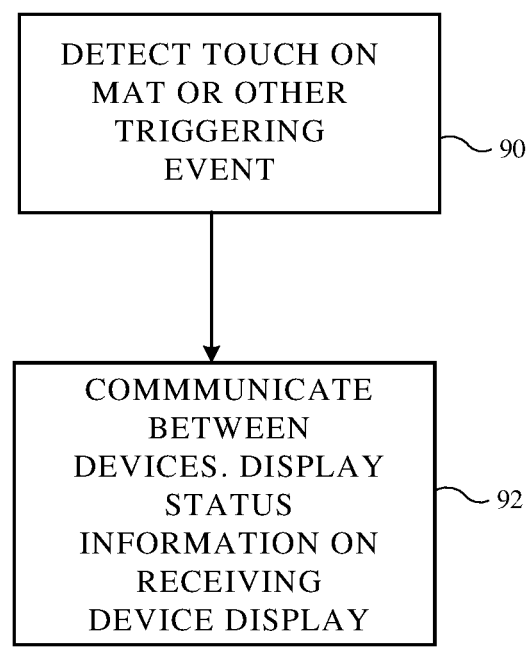
FIG. 4 is a flow chart of illustrative operations involved in operating a wireless power system in accordance with an embodiment.

Illustrative operations associated with using system 8 are shown in FIG. 4.

During the operations of block 90, system 8 may monitor for user input or other triggering input to trigger the presentation of charging status information or other information to a user. Sensors such as sensors in input-output devices 70 and/or sensors in input-output devices 56, and/or other circuitry in system 8 (e.g., control circuitry 16 and/or 30) may be used in monitoring for triggering events. Examples of triggering events include detection of a user tap, a user double tap, a swipe gesture, or other user finger input (e.g. a tap or other finger input on device 12 or one of device(s) 24), detection of voice input such as a voice command, detection of an air gesture (three-dimensional gesture), detection of device motion (e.g., detection of lifting of device 24 from charging surface 74), detection of the unplugging of a cable such as a cable used for wired power transfer from device 12 to device 24, detection of force sensor input, optical sensor input, touch sensor input, accelerometer input or other motion sensor input, and/or other sensor input. Air gestures may be detected when a user waves a hand or other external object over device 12 and/or when a user waves device 24 near device 12. Device 12 can use an optical proximity sensor and/or devices 12 and/or 24 can use other sensors in input-output devices 70 and/or 56 to detect when device 24 is waved near device 12.

In response to detection of a triggering event, processing may proceed to the operations of block 92, where charging status information and/or other information (e.g., a home screen including charging status information and/or other information) may be presented to a user. During the operations of block 92, devices in system 8 may communicate with each other to exchange charging status information and other information and/or to exchange commands. For example, if user input was detected by device 12 during the operations of block 90, device 12 can inform one or more devices 24 with display(s) that the user input has been received, thereby directing device(s) 24 to display charging status information or other information (see, e.g., the information displayed in the example of FIG. 3). Before device 12 causes device(s) 24 to display the information, device(s) 24 may be providing a blank (e.g., displaying black, off, in touch-sensitive but display-off mode, and so forth) screen on display 76.

In response to the information provided by device 12 to device 24 or received from other devices 24 in the system, device 24 can gather charging status information such as information on the state-of-charge of battery 58 and information on whether wireless power is currently being received by device 24 from device 12. This information may then be displayed on the display of each device 24 in system 8 (e.g., the blank screen of each device 24 may be replaced by a screen containing icons and other information of the type shown in FIG. 3) and/or may otherwise be presented to the user with an output device in device(s) 24. In embodiments in which multiple devices 24 are present, charging status information may be gathered from multiple devices 24 and presented on the display of one or more of these devices 24. In some embodiments, device 12 may have an output device such as a display and may display charging status information and/or other information in addition to or instead of using one or more of devices 24 to display this information.

Consider, as an example, a scenario in which multiple devices 24 are present on a wireless charging mat or other device 12 with multiple wireless power transmitting coils. Device 12 may use the transmitting coils to communicate respectively (e.g., via in-band communications) with devices 24 and/or may use out-of-band wireless communications circuitry to communicate with devices 24. In this way, a tap on device 12 or a tap on one of devices 24 or other triggering event (e.g., lifting one of devices 24 away from device 12) that is detected by device 12 and/or one of devices 24 can be used to cause the display of information such as charging status information on each of devices 24 in system 8 (and, if desired, on device 12). Charging status can also be displayed on each of devices 24 in system 8 (and, if desired, on device 12) in response to detection of an air gesture with a hand or device 24 in the vicinity of device 12 (e.g., detection of waving motion of device 24 in the vicinity of device 12 using an optical sensor such as an optical proximity sensor in device 12 and/or the waved device 24 and/or other device(s) 24 and/or detection of the waving motion of device 24 using one or more other sensors in input-output devices 70 and/or 56).

The foregoing is merely illustrative and various modifications can be made to the described embodiments. The foregoing embodiments may be implemented individually or in any combination.

What is claimed is:

1. A wireless power transmitting device for transmitting wireless power to a wireless power receiving device with a display, comprising:
   wireless power transmitting circuitry configured to transmit wireless power signals to the wireless power receiving device;
   an accelerometer configured to detect user input; and
   control circuitry configured to wirelessly communicate with the wireless power receiving device in response to detecting the user input to cause the wireless power receiving device to display charging status information on the display.

2. The wireless power transmitting device of claim 1 further comprising a housing with a charging surface, wherein the user input comprises a tap on the charging surface.

3. The wireless power transmitting device of claim 2 wherein the display is providing a blank screen prior to displaying the charging status information and wherein the control circuitry is configured to communicate with the wireless power receiving device in response to detecting the user input to cause the wireless power receiving device to display the charging status information in place of the blank screen.

4. The wireless power transmitting device of claim 3 wherein the charging status information includes battery state-of-charge information for a battery in the wireless power receiving device.

5. The wireless power transmitting device of claim 3 wherein the charging status information includes battery state-of-charge information for a battery other than a battery in the wireless power receiving device.

6. The wireless power transmitting device of claim 3 wherein the charging status information includes information on whether wireless power is being transmitted from the wireless power transmitting circuitry to the wireless power receiving device.

7. The wireless power transmitting device of claim 1 wherein the control circuitry is configured to communicate with the wireless power receiving device using in-band wireless communications in response to detecting the user input.

8. The wireless power transmitting device of claim 1 wherein the control circuitry is configured to communicate with the wireless power receiving device using out-of-band wireless communications in response to detecting the user input.

9. The wireless power transmitting device of claim 1 wherein the displayed charging status information covers at least 10% of the display.

10. A wireless power transmitting device, comprising:
a housing with a charging surface;
wireless power transmitting circuitry that is configured to transmit wireless power signals to a wireless power receiving device on the charging surface;
an accelerometer; and
control circuitry configured to detect a triggering event using the accelerometer and, in response to detection of the triggering event, wirelessly communicate with the wireless power receiving device to cause the wireless power receiving device to display charging status information associated with charging of a battery in the wireless power receiving device using the wireless power signals.

11. The wireless power transmitting device of claim 10 wherein the charging status information comprises battery state-of-charge information.

12. A wireless power receiving device configured to receive wireless power from a wireless power transmitting device while resting on a charging surface of the wireless power transmitting device, comprising:
wireless power receiving circuitry configured to receive the wireless power;
a battery having a state of charge;
a display;
a sensor configured to detect motion resulting from a finger tap on the charging surface; and
control circuitry, operatively coupled to the wireless power receiving circuitry, the battery, and the display, and configured to:
in response to detection of the finger tap on the charging surface with the sensor, display information on the state of charge on the display.

13. The wireless power receiving device of claim 12 wherein the sensor comprises an accelerometer and wherein the control circuitry is configured to:
in response to detection of the finger tap on the charging surface with the sensor, display information on whether wireless power is being received by the wireless power receiving circuitry.

14. The wireless power receiving device of claim 12 wherein the control circuitry comprises wireless communications circuitry for receiving battery state-of-charge information for a portable electronic device resting on the charging surface and wherein the control circuitry is configured to:
in response to detection of the finger tap on the charging surface with the sensor, display both the state of charge of the battery and the battery state-of-charge information for the portable electronic device on the display.

* * * * *